United States Patent
Schrader et al.

[11] 3,864,115
[45] Feb. 4, 1975

[54] 4-SUBSTITUTED 1,2-METHYLENE DIOXYBENZENE COMPOUNDS AS PLANT GROWTH REGULANTS

[75] Inventors: Gerhard Schrader, Wuppertal-Cronenberg; Klaus Lürssen, Koenigsdorf, both of Germany

[73] Assignee: Bayer Aktiengesellschaft, Leverkusen, Germany

[22] Filed: July 6, 1972

[21] Appl. No.: 269,373

[30] Foreign Application Priority Data
July 10, 1971  Germany............................ 2134499

[52] U.S. Cl.............................. 71/88, 71/76, 71/77, 71/78, 71/87, 71/88, 71/90, 260/327 M, 260/340.5
[51] Int. Cl............................................... A01n 9/28
[58] Field of Search ....... 71/88; 424/282; 260/340.5

[56] References Cited
UNITED STATES PATENTS

| | | | |
|---|---|---|---|
| 2,456,644 | 12/1948 | Mueller et al. | 260/340.5 |
| 2,493,927 | 1/1950 | Prill | 424/282 |
| 2,852,427 | 9/1958 | Eden | 71/88 |

OTHER PUBLICATIONS
Esaac et al., "Metabolism in Relation to Mode of Action," (1969), J. Agr. Food Chem. 17, pp. 539–550 (1969).

*Primary Examiner*—Glennon H. Hollrah
*Attorney, Agent, or Firm*—Burgess, Dinklage & Sprung

[57] ABSTRACT

4-Substituted 1,2-methylene dioxybenzene compounds of the formula

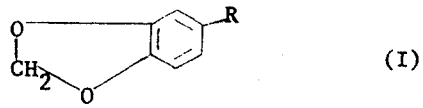

in which
R is alkyl or alkenyl each of which may be substituted one or more times by halogen, O,O-dialkyldithiophosphate, O-alkyldithiophosphonate and/or optionally substituted arylthio; or a radical of the formula

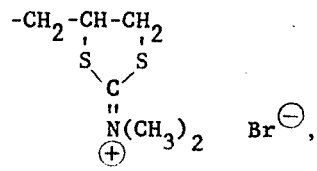

are outstandingly effective as plant growth regulants to stimulate, inhibit or alter the growth of plants or parts thereof.

8 Claims, No Drawings

4-SUBSTITUTED 1,2-METHYLENE DIOXYBENZENE COMPOUNDS AS PLANT GROWTH REGULANTS

The present invention relates to plant-growth-regulating compositions containing certain 4-substituted 1,2-methylene dioxybenzene compounds as plant growth regulants and the use of such compounds to regulate plant growth.

It is known that gibberellic acid exhibits plant-growth-regulating properties. The compounds of this invention exhibit similar activity. However, the substances according to the invention are readily accessible industrially by simple processes of synthesis, whereas the naturally occurring gibberellic acids are not so accessible (see R. Wegler, Chemie der Pflanzenschutz- und Schädlingsbekampfungsmittel, 1970, Volume II, p. 401 f).

It has now been found that 4-substituted 1,2-methylene dioxybenzene compounds of the following formula exhibit marked activity:

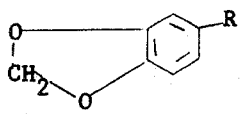
(I)

in which

R is alkyl or alkenyl each of which may be substituted one or more times by halogen, OO-dialkyldithiophosphate, O-alkyldithio-phosphonate and/or optionally substituted (e.g. halogenated) arylthio; in the case of substitution by the thiophosphates, thiophosphonates or the arylthio, the linkage to the alkyl or alkenyl is through the sulfur atom.

R can also be a structure of the formula

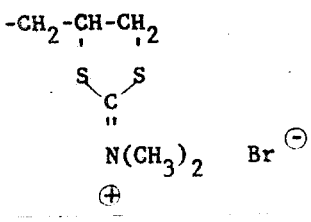

These compounds, which may be conveniently regarded as safrole-type derivatives, exhibit strong plant-growth-influencing effects.

R is preferably lower alkyl of from 1 to 4 carbon atoms or alkenyl of from 2 to 4 carbon atoms, each of which may be substituted as mentioned above. Preferred substituents are bromine, chlorine, O,O-di($C_{1-4}$) alkyldithiophosphate, O-($C_{1-4}$) alkyl-dithionophosphonate, phenylthio and/or halogen-substituted phenylthio.

The invention therefore provides a plant-growth-influencing composition containing as active ingredient a compound of formula (I) in admixture with a solid or liquefied gaseous diluent or carrier or in admixture with a liquid diluent or carrier containing a surface-active agent.

The invention also provides a method of influencing plant growth which comprises applying to the plant or its habitat a compound of formula (I) alone or in the form of a composition containing as active ingredient a compound of formula (I) in admixute with a diluent or carrier.

Some of the compounds of formula (I) are known. They have not, however, up to now been used as plant-growth-regulating agents (cf. Receuil Trav. chim. Pays Bas 86,31–32 (1967); Acta Chimica Acad. Sci. Hung. 42 No. 1, pages 47–52 (1964)). Those compounds which are still new can be prepared in simple manner according to processes which are in principle known, for example, by addition of hydrogen bromide or bromine to safrole or isosafrole. The corresponding chlorinated compounds may be obtained by chlorination of safrole or isosafrole with sulfuryl chloride. By reaction of the so obtained mono- or di-halogen-safrole or isosafrole derivatives with, for example, sodium O,O-diethyldithiophosphate, optionally in the presence of a solvent, at temperatures between 0° and 100°C, the corresponding safrole derivatives (or isosafrole derivatives) substituted by a O,O-diethyldithiophosphate radical are obtained. As solvent, inert polar organic solvents, such as acetonitrile, dimethyl formamide, dimethyl sulfoxide, ethyl acetoacetate or chloroform, are suitable, Preferably, acetonitrile is used.

The following examples are illustrations of the preparation of the instantly used compounds:

EXAMPLE 1

Preparation of 4-(2-bromopropyl)-1,2-methylenedioxybenzene (Compound 1)

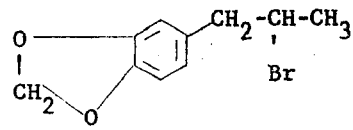

65 g safrole were dissolved in 100 ml glacial acetic acid. At 20°C, there was added, with stirring, a solution of 100 g HBr in glacial acetic acid. Stirring was continued for a further 12 hours at room temperature and the acetic acid was then distilled off in a vacuum. The residue was taken up in 200 ml benzene and washing was effected several times with, in each case 100 ml of water. The benzene solution was dried over sodium sulfate. When fractionation was effected, 43 g 4-(2-bromopropyl)-1,2-methylenedioxybenzene of the b.p. 90°C/0.05 mm Hg were obtained.

EXAMPLE 2

Preparation of 4-(2-bromo-3-[O,O-diethylthionothiolphosphate]-propyl)-1,2-methylenedioxybenzene (Compound 2)

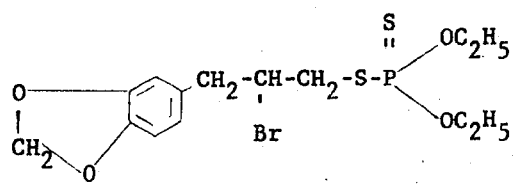

80 g of 4(2,3-dibromopropyl)-1,2-methylenedioxybenzene were dissolved in 100 ml acetonitrile. At 70°C, 52 g O,O-diethyldithiophosphate dissolved in 200 ml acetonitrile were added. The temperature of 70°C was maintained for a further 2 hours.

The mixture was then taken up in 300 ml benzene and thorough washing was effected 3 times with, in each case, 100 ml of water. After drying of the benzene solution over sodium sulfate, the solvent was distilled off in a vacuum. There were thus obtained 88 g of the new ester as colorless, water-insoluble oil.

Yield: 82% of the theory.
Refractive index: $n_D^{25} = 1.5751$

Under analogous reaction condition the compounds of the following Examples 3 and 4 were obtained:

EXAMPLE 3

4-(2-bromo-3-[ethyl-O-ethylthionothiophosphate]-propyl)-1,2-methylenedioxybenzene (Compound 3)

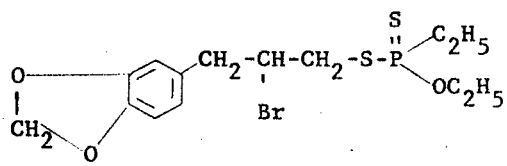

Refractive index $n_D^{24} = 1.5883$

EXAMPLE 4

4-(2-bromo-3-phenylthio-propyl)-1,2-methylenedioxybenzene (Compound 4)

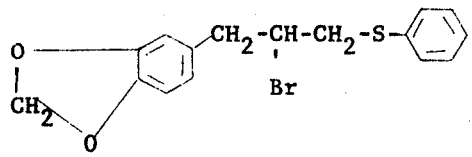

Refractive index $n_D^{25} = 1.6220$

EXAMPLE 5

4-(3,4-methylenedioxy-benzyl)-2-dimethylimonium-1,3-thiolane bromide (Compound 5)

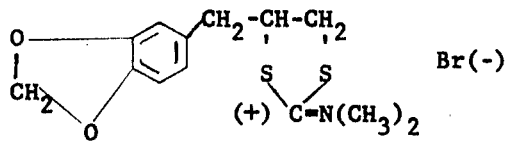

80 g dibromosafrole were dissolved in 400 ml acetonitrile. To this there were added at 60°C, with stirring, 50 g sodium dimethyldithiocarbamate. The temperature was kept at 70°C for a further 2 hours. Cooling to room temperature was then effected and the precipitated sodium bromide was filtered off with suction. After the solvent had been distilled off, 85 g of the new compound were obtained as colorless crystals. m.p. (from ethanol) 215°C.

Yield: 94% of the theory. The compound is soluble in water.

The compounds of the following Examples 6–12 were prepared by analogous processes.

EXAMPLE 6

4-(2,3-dichloropropyl)-1,2-methylenedioxybenzene (Compound 6)

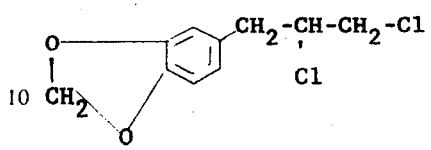

b.p. 140°/2 mm Hg
$n_D^{25} = 1.5614$

EXAMPLE 7

4-(prop-1-enyl(-1,2-methylenedioxybenzene (Compound 7)

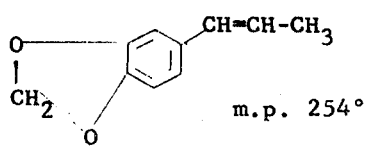

m.p. 254°

EXAMPLE 8

4-(1,2-dichloropropyl)-1,2-methylenedioxybenzene (Compound 8)

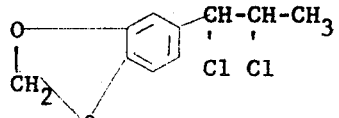

b.p. 136°/2 mm Hg

EXAMPLE 9

4-(1,2-dibromopropyl)-1,2-methylenedioxybenzene (Compound 9)

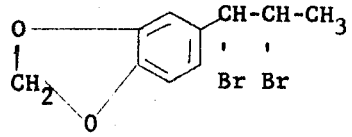

m.p. 44°

EXAMPLE 10

4-(1-p-chlorophenylthio-2-bromopropyl)-1,2-methylenedioxybenzene (Compound 10)

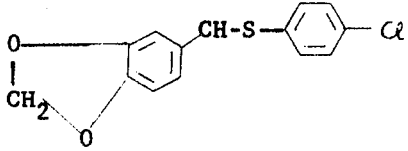

$n_D^{22} = 1.6089$

EXAMPLE 11

4-(2-bromo-prop-1-enyl)-1,2-methylenedioxybenzene (Compound 11)

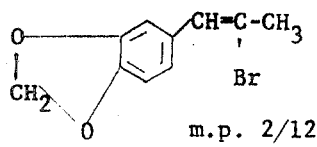

m.p. 2/120°

$n_D^{22} = 1.6030$

EXAMPLE 12

4-(2-bromo-3-p-chlorophenylthio-propyl)-1,2-methylenedioxybenzene (Compound 12)

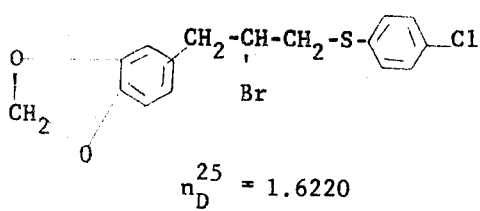

$n_D^{25} = 1.6220$

The active compounds according to the invention influence the physiological phenomena of plant growth and can therefore be used as plant growth regulators.

The different effects of the active compounds depend essentially on the point in time of the application, with reference to the development stage of the plant (including the seed), as well as on the concentrations applied.

Plant-growth regulators are used for various purposes which are connected with the development stage of the plant.

Thus, with plant growth regulators the seed dormancy can be broken in order to cause the seeds to germinate at the desired time even though the seed itself shows no readiness to germinate. The seed germination itself can either be inhibited or promoted by such active compounds, depending on the concentration applied. This inhibition or promotion relates to the seedling development.

The shoot or root growth can be promoted or inhibited by the active compounds in manner dependent on concentration. Thus, it is possible for example to inhibit very strongly the growth of the fully formed plant, or to bring the plant as a whole to a more robust habitus or to produce a dwarf growth.

During the growth of the plant, the branching to the side can be mulitplied by a chemical breaking of the apical dominance. This may be of interest, for example, in the propagation of plants by cuttings. In concentration-dependent manner, it is also possible to inhibit the growth of side-shoots, for example in order to prevent the formation of side-shoots in tobacco plants after decapitation and thus to promote the leaf growth. With growth regulators it is also possible to reduce the transpiration rate of the plants in order to prevent damage by drying out.

In the influencing of blossom formation, there can be achieved, in manner dependent on concentration and the time of the application, either a retarding or an acceleration of blossom formation. Under certain circumstances, a multiplication of blossom initiation can also be attained, these effects occurring when the appropriate treatments are carried out at the time of the normal blossom formation. Furthermore, the formation of predominantly female or of predominantly male blossoms can be achieved.

Fruit initiation can be promoted so that more fruits, or seedless fruits, are formed (parthenocarpy). Under certain conditions, the premature fall of fruit can also be prevented, or the fruit fall can be promoted up to a certain extent in the sense of a chemical thinning out. The ability to promote fruit fall can be exploited by effecting the treatment at the time of the harvest, whereby the latter is facilitated.

With growth regulators it is also possible to accelerate or retard the fruit ripeness and to improve fruit coloration. A temporal concentration of fruit ripeness is also possible, whereby the fruits are made to ripen more or less simultaneously.

Yield increases with the aid of growth regulators can be attained both by promotion of fruit initiation and by formation of larger fruits or by promotion of the vegetative growth. Further, a stimulation of the synthesis or of the outflow of secondary, vegetable contained-substances (for example the latex flow of rubber trees) is possible.

The active compounds to be used according to the present invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chlorethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulfoxide or acetonitrile, as well as water.

By liquefied gaseous diluents or carriers are meant liquids which would be gaseous at normal temperatures and pressures, e.g. aerosol propellants, such as halogenated hydrocarbons, e.g. freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying agents include nonionic and anionic emulsifiers, such as polyoxyethylene-fatty acid esters, polyoxyethylene-fatty alcohol ethers, for example alkylarylpolyglycol ethers, alkyl sulfonates, alkyl sulfates and aryl sulfonates; and preferred examples of dispersing agents include lignin, sulfite waste liquors and methyl cellulose.

The formulations contain, in general, from 0.1 to 95, preferably 0.5 to 90, per cent by weight of active compound. The formulations may be diluted for actual application, for example to the concentrations mentioned below.

The active compounds may be applied as such or in the form of their formulations or the application forms prepared therefrom, such as ready-to-use solutions, emulsifiable concentrates, emulsions, suspensions, spray powders, pastes, soluble powders, dusting agents and granulates. Application may take place in the usual manner, for example by squirting, spraying atomizing, dusting, scattering, fumigation, vaporization, watering, dressing or incrustation.

The concentrations of active compound in the ready-to-apply preparations can be varied within fairly wide ranges. In general, they are from 0.0001 to 10%, preferably 0.01 to 1%, by weight.

The active compounds can also be used with good results in the ultra-low-volume (ULV) method, where it is possible to apply formulations of up to 95% or even the 100%-strength active compound alone.

The invention is further illustrated by the following Examples. In test Examples A–D, the compounds to be used according to the invention are identified by numbers corresponding to those in preparative Examples 1 to 12, above.

EXAMPLE A

Elongation of Stem Model ("Gibberellic acid activity")

The last stem node and a 2 cm long piece of the last internode before the inflorescence of oat plants were, at the commencement of coming into ear, cut out with a razor blade and put into an active-compound-containing solution with the node downward. Substances with gibberellic acid activity cause a strong growth in length of the internode in the surrounding leaf sheath (see P. B. Kaufmann: Plant Physiol, 18, 703 (1965)).

To produce a suitable preparation of active compound, 1 part by weight of active compound was mixed with 10 parts by weight of methanol and 2 parts by weight of polyethylene sorbitan monolaurate, and water was added until the desired concentration was reached.

The active compounds, the concentrations of the active compounds and the results can be seen from the following Table 1.

In this table,

+++ denotes strong activity

++ denotes medium activity

+ denotes slight activity

TABLE 1

Gibberellic acid activity

| Active compound (Example number) | Concentration | Activity |
|---|---|---|
| 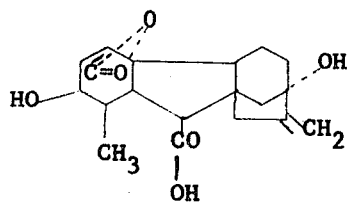 (gibberellic acid; known) | 40 ppm | +++ |
| 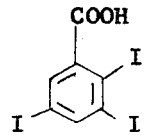 (known) | 40 ppm | + |
| 1 | 40 ppm | +++ |
| 2 | 40 ppm | +++ |
| 3 | 40 ppm | +++ |
| 12 | 40 ppm | +++ |

EXAMPLE B

Growth Inhibition in Cress Seedlings

Solvent: 10 parts by weight methanol
Emulsifier: 2 parts by weight polyethylene sorbitan monolaurate To produce a suitable preparation of active compound, 1 part by weight of active compound was mixed with the stated amounts of solvent and emulsifier, and water was added until the desired concentration was reached.

50 cress seeds were laid out on a filter paper onto which the preparation of active compound had been dripped. The cress seeds remained adhering to the moist filter paper. The latter was placed vertically in a glass beaker of 250 ml capacity. The glass beaker was filled with 20 ml of the preparation of active compound and covered with a glass plate. After 4 days the seedlings were measured and the percentage inhibition of growth in length as compared with the control (distilled water with the corresponding amounts of solvent and emulsifier) was calculated.

The active compounds, the concentrations of active compound and the results can be seen from the following Table 2.

TABLE 2

| Growth inhibition in cress seedlings | | |
|---|---|---|
| Active compound (Example number) | Concentration | Inhibition (per cent) |
| Cl-CH$_2$-CH$_2$-N$^+$(CH$_2$)$_3$ Cl$^-$ (Trimethyl-2-chloroethyl, ammonium chloride; known) | 200 ppm | 5 % |
| 6 | 200 ppm | 40 % |
| 7 | 200 ppm | 50 % |
| 8 | 200 ppm | 70 % |
| 9 | 200 ppm | 40 % |
| 11 | 200 ppm | 20 % |

Surprisingly, the safrole derivatives to be used according to the invention show remarkably higher plant-growth-regulating effects than the trimethyl-2-chloro-ethyl-ammonium chloride, an active compound of the same type of activity known from the prior art. The active compounds to be used according to the invention therefore represent a valuable enrichment of the art.

EXAMPLE C

Retardment of Senescence in Barley

Solvent: 10 parts by weight methanol
Emulsifier: 2 parts by weight polyethylene sorbitan monolaurate To produce a suitable preparation of active compound, 1 part by weight of active compound was mixed with the stated amounts of solvent and emulsifier, and water was added until the desired concentration was reached.

Primary leaves of barley plants were cut into pieces 1 cm in length. Four such leaf pieces were each placed on filter paper in a Petri dish with 4 ml of the solution of active compound. Growth regulators retarded the yellowing of the leaf pieces as compared with the water control. After 4 days, this retardment of senescence was evaluated.

The active compounds, the concentrations of the active compounds and the results can be seen from the following Table 3.

In this table,
+++ denotes strong
++ denotes medium
+ denotes slight
0 denotes no retardment of senescence as compared with the control treated with water only

TABLE 3

| Retardment of senescence in barley | | |
|---|---|---|
| Active compound (Example number) | Concentration | Retardment of senescence |
| Cl-CH$_2$-CH$_2$-N$^+$(CH$_3$)$_3$ Cl$^-$ | 1000 ppm | + |
| | 200 ppm | 0 |
| | 40 ppm | 0 |
| (known) 12 | 200 ppm | +++ |
| | 40 ppm | + |
| 6 | 200 ppm | +++ |
| 8 | 200 ppm | +++ |
| 9 | 200 ppm | +++ |
| 10 | 200 ppm | +++ |
| 11 | 200 ppm | +++ |

EXAMPLE D

Growth Inhibition in Beans

Solvent: 10 parts by weight methanol
Emulsifier: 2 parts by weight polyethylene sorbitan monolaurate To produce a suitable preparation of active compound, 1 part by weight of active compound is mixed with the stated amounts of solvent and emulsifier, and water is added until the desired concentration is reached.

Young bean plants about 10 cm high are sprayed with the preparations of active compound until dripping wet. After 14 days, the growth increase is measured and the growth inhibition as a percentage of the growth increase of the control plants is calculated.

The active compounds, the concentration of active compound and the results can be seen from the following Table 4.

TABLE 4

| Growth inhibition in beans | | |
|---|---|---|
| Active compound (Example number) | Concentration | Inhibition (per cent) |
| Cl-CH$_2$-CH$_2$-N$^+$(CH$_3$)$_3$ Cl$^-$ (known) | 500 ppm | 25 % |
| 5 | 500 ppm | 45 % |

It will be understood that the specification and examples are illustrative but not limitative of the present invention and that other embodiments within the spirit and scope of the invention will suggest themselves to those skilled in the art

What is claimed is:

1. Method of influencing plant growth which method comprises applying to the locus thereof a 4-substituted 1,2-methylene dioxybenzene compound of the formula

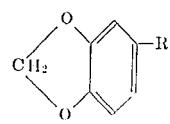

in which R is alkyl or alkenyl, each of which may be substituted one or more times by halogen, hydrocarbyl arylthio or halogenated hydrocarbyl arylthio, wherein said alkyl or alkenyl contain not more than 4 carbon atoms, in an amount effective to influence plant growth.

2. A method according to claim 1 in which a composition comprising (1) a finely divided dispersible carrier solid containing a surface-active agent selected from the group consisting of non-ionic emulsifying agents, anionic agents, and (2) a dispersible carrier liquid selected from the group consisting of inert organic solvents, water, and mixtures thereof, and containing from 0.0005 to 2 percent of a 4-substituted 1,2-methylenedioxybenzene compund, by weight, is applied.

3. A method according to claim 1 in which the 4-substituted 1,2-methylenedioxybenzene is applied to an area of agriculture in an amount of substantially between 0.1 to 100 kg per hectare.

4. A method according to claim 3 in which the 4-substituted 1,2-methylene dioxybenzene is applied to an area of agriculture in an amount of substantially between 1 to 10 kg per hectare.

5. Method according to claim 1 wherein said compound is applied in a growth promoting effective amount.

6. Method according to claim 1 wherein said compound is applied in a growth inhibiting effective amount.

7. Method according to claim 1 wherein said compound is applied to the soil in which the plants grow.

8. Method according to claim 1 wherein said compound is selected from the group consisting of 4-(2-bromopropyl)-1,2-methylenedioxybenzene and 4-(2-bromo-3-phenylthio-propyl)-1,2-methylenedioxybenzene.

* * * * *